(12) United States Patent
Petersson et al.

(10) Patent No.: US 7,758,715 B2
(45) Date of Patent: Jul. 20, 2010

(54) METHOD OF FORMING A COMPOSITE STRUCTURE

(75) Inventors: Mikael Petersson, Linköping (SE); Per Hallander, Linköping (SE); Björn Weidmann, Borensberg (SE)

(73) Assignee: SAAB AB, Linköping (SE)

( * ) Notice: Subject to any disclaimer, the term of this patent is extended or adjusted under 35 U.S.C. 154(b) by 19 days.

(21) Appl. No.: 12/258,469

(22) Filed: Oct. 27, 2008

(65) Prior Publication Data

US 2009/0110836 A1    Apr. 30, 2009

(30) Foreign Application Priority Data

Oct. 25, 2007    (EP) .................................. 07119322

(51) Int. Cl.
| | |
|---|---|
| *F02F 1/06* | (2006.01) |
| *C09J 5/10* | (2006.01) |
| *B29C 65/00* | (2006.01) |
| *B29C 45/14* | (2006.01) |
| *B32B 37/00* | (2006.01) |
| *B32B 3/00* | (2006.01) |
| *C08J 5/00* | (2006.01) |

(52) U.S. Cl. .............. 156/307.1; 156/303.1; 156/306.9; 264/277; 428/61
(58) Field of Classification Search .................. 156/60, 156/83, 196, 292, 293, 294, 303.1, 306.6, 156/306.9, 307.1, 307.3; 427/379; 264/261
See application file for complete search history.

(56) References Cited

U.S. PATENT DOCUMENTS

| | | | |
|---|---|---|---|
| 4,151,031 | A | 4/1979 | Goad et al. |
| 4,219,980 | A | 9/1980 | Loyd |
| 4,559,005 | A | 12/1985 | Gants et al. |
| 5,650,229 | A | 7/1997 | Gross et al. |
| 5,827,383 | A | 10/1998 | Campbell et al. |
| 2003/0183067 | A1 | 10/2003 | Cundiff et al. |
| 2005/0112321 | A1* | 5/2005 | Millard et al. ................. 428/98 |

OTHER PUBLICATIONS

European Search Report—Apr. 28, 2008.

* cited by examiner

*Primary Examiner*—Richard Crispino
*Assistant Examiner*—Brian R Slawski
(74) *Attorney, Agent, or Firm*—Venable LLP; Eric J. Franklin

(57) ABSTRACT

A method of manufacturing a composite structure including a plurality of sheets and a radius filler. The radius filler is adapted to fill a gap at least partially formed by the sheets of the composite structure. The radius filler includes a plastic material with a first curing temperature. The sheets include a plastic material with a second curing temperature. The method includes arranging the sheets in a desired shape, applying the radius filler material into the gap, exposing the sheets and the radius filler material to the first temperature, whereby the material of the radius filler cures, and exposing the sheets and the radius filler to the second temperature, which exceeds the first temperature, whereby the material of the sheets cures. A radius filler for filling gaps between sheets of a composite structure. The material of the radius filler has a curing temperature which is below the curing temperature of the sheets of the composite structure.

15 Claims, 2 Drawing Sheets

METHOD OF FORMING A COMPOSITE STRUCTURE

CROSS-REFERENCE TO RELATED APPLICATIONS

This application claims priority to European patent application 07119322.1 filed 25 Oct. 2007.

TECHNICAL FIELD

The present invention pertains to a method of manufacturing a composite structure, and to a radius filler for a composite structure.

BACKGROUND ART

In composite structures, joints between adjacent structure components, such as fiber-reinforced sheets and/or reinforcing ribs, are often subject to stress concentrations which may cause crack initiation. At worst, such cracks may propagate through the structure and lead to failure.

A major cause of the stress concentrations are voids or gaps, which commonly are formed in connection with component junctions. The traditional remedy in this regard is to occupy the voids by introducing a material; a so-called radius filler.

During manufacture of composite structures from fiber-reinforced sheets, it is furthermore important that the individual sheets maintain a desired shape in the juncture regions. The forming of the sheets to the desired shape, and/or pressure applied in the manufacturing process, may force sheets to enter the juncture gaps, whereby the fibers of the sheets are misaligned and the bearing capacity of the structure decreased. Such misalignment can be counteracted by means of radius fillers, provided that the radius fillers are rigid, and thus provide backing, during manufacture of the composite structures.

Thus, radius fillers can be used in order to increase fatigue properties and structural strength of composite structures.

U.S. Pat. No. 5,650,229 A discloses a preformed radius filler which is adapted to fill a gap between plies of a composite article. The filler comprises unidirectional fibers and a stabilizer, which stabilizer is compatible with, and simultaneously curable with, a subsequently injected resin.

In U.S. Pat. No. 5,827,383 A, a radius filler comprising fibers and resin is used, and a joint between fiber reinforced sheets is further strengthened by means of pins.

US20030183067 A1 describes a fiber reinforced radius filler with a binding agent/tackifier solution.

A problem associated with prior radius fillers, is that they are relatively complex in regards to structure and manufacture. Further, known radius fillers present unsatisfying shapes and provide poor support to composite sheets during forming of the sheets.

SUMMARY OF THE INVENTION

The object of the present invention is to provide a composite structure with a reinforcing radius filler of optimal shape. Said radius filler shall neither require a separate manufacturing process, nor a separate curing process.

The objective is achieved by the present method of manufacturing a composite structure comprising a plurality of sheets and a radius filler, wherein the radius filler is adapted to fill a gap at least partially formed by the sheets of the composite structure. The radius filler comprises a plastic material with a first curing temperature and the sheets comprise a plastic material with a second curing temperature. The method includes the steps of arranging the sheets in a desired shape, applying the radius filler material into the gap, exposing the sheets and the radius filler material to the first temperature, whereby the material of the radius filler cures, and exposing the sheets and the radius filler to the second temperature, which exceeds the first temperature, whereby the material of the sheets cures.

The gap can be formed between joint sheets of a composite structure. A corresponding gap can also be formed between sheets belonging to neighbouring composite structures, or between a sheet and a reinforcing element of a composite structure.

The use of materials with different curing temperatures for the radius filler and the sheets, respectively, enables curing of the different composite structure components at separate times during one heating process. Further, since the sheets are not yet cured when the filler material cures, expansion of the filler material is allowed.

According to the method, the radius filler material, prior to curing, is at least partially formed to the form of the radius filler by the sheets. Thus, the sheets act as an outer mould for the radius filler material, whereby the radius filler is closely formed to the sheets. After curing of the radius filler material, instead, the radius filler defines the form of the sheets by acting as a mould core for the sheets. Thereby, the sheets are less susceptible to wrinkling due to outer pressure during curing.

The radius filler material comprises a first thermosetting material. This thermosetting material cures at the first temperature, where after the radius filler is relatively stiff and acts as a mould core for the sheets. For the sheets, a different thermosetting material is used, which material cures at the second temperature. However, in principle, the radius filler serves its purpose even if a thermoplastic material is used for the sheets.

In accordance with the present invention, it is desired that the radius filler material is at least partly cured before the sheet material cures. In order to ensure sufficient curing of the radius filler material, the composite structure can be kept constant at the first temperature for a time period of 10-120 minutes, preferably 15-60 minutes, before the temperature is increased to the second temperature, for curing of the sheet material.

When applied into the gap, the radius filler material can be of varying consistency. E.g. the radius filler material can be of a formable pasty consistency, or of a liquid injectable consistency.

Further, the objective of the present invention is achieved by means of a radius filler for filling gaps which are at least partially formed between sheets of a composite structure. The material of the radius filler has a curing temperature which is below the curing temperature of the sheets of the composite structure.

BRIEF DESCRIPTION OF THE DRAWINGS

By way of example, an embodiment of the present invention is illustrated in the enclosed schematic figures, where.

DETAILED DESCRIPTION OF AN EMBODIMENT

The disclosure below is not intended to limit the claimed scope of the present invention in any way.

Figure 1:
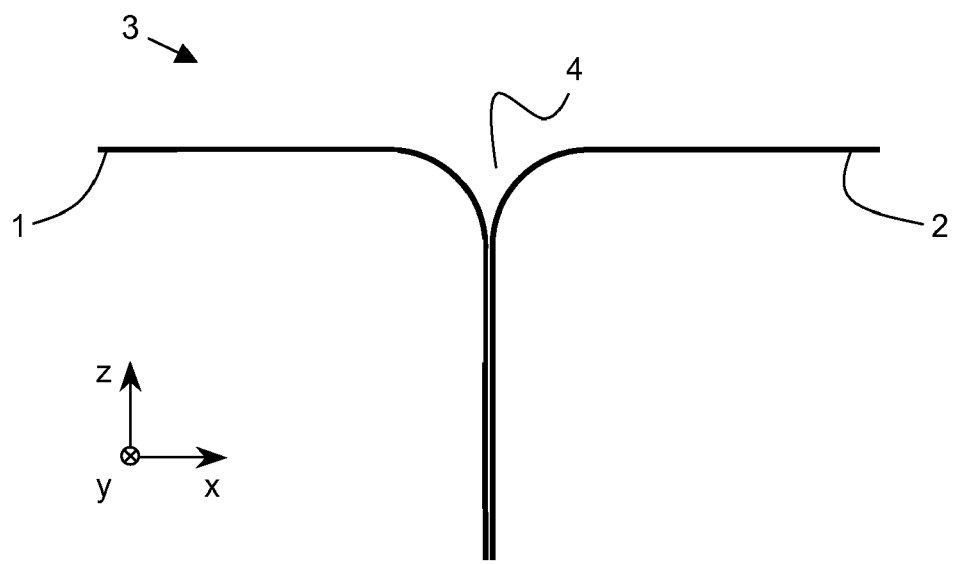
FIG. 1 shows a first step of a method of manufacturing a composite structure comprising a plurality of sheets and a radius filler.

FIG. 1 schematically illustrates a cross-section of two prepreg side sheets 1, 2, which are laminated together to form a composite structure 3. The sheets 1, 2 can have an arbitrary extension in the y-direction. In the present example, the sheets are shaped and joint together so as to form a T-junction. In said junction, an open void, crevice, or gap 4 is created.

Figure 2:
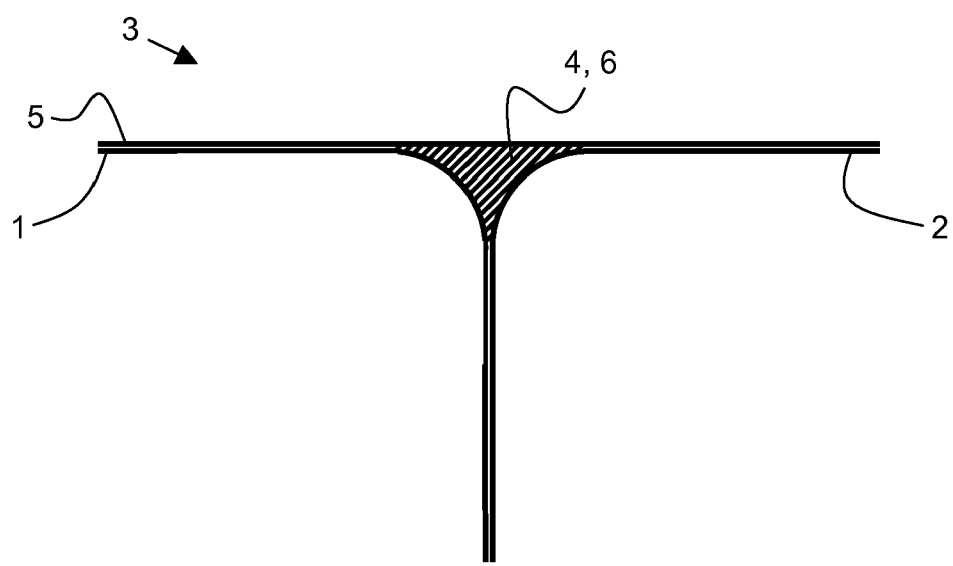
FIG. 2 shows the sheets and the radius filler.

In FIG. 2, this gap 4 is closed by a further top sheet 5. In this connection, the gap 4 is filled by a radius filler material 6. Said radius filler material 6 can be applied into the gap 4 before or after the gap 4 is closed by means of the top sheet 5.

At the time of application into the gap 4, the radius filler material 6 is viscous to a certain extent. Thereby, the radius filler material 6 is formed by the prepreg sheets 1, 2, 5, which at this time, compared to the radius filler material 6, are stiff.

The radius filler material 6 can be applied in a pasty form into the gap 4 formed by the side sheets 1, 2 in FIG. 1. After positioning of the top sheet 5, said pasty filler material 6 is shaped into the desired shape, i.e. a triangle with two inwardly cambered side walls and one straight side wall, by means of the sheets 1, 2, 5 (FIG. 2) defining the gap 4. Alternatively, the side and top sheets 1, 2, 5 are assembled to form the T-junction, whereupon the radius filler material 6 is injected in a liquid or semi-liquid form into the gap 4.

Figure 3:
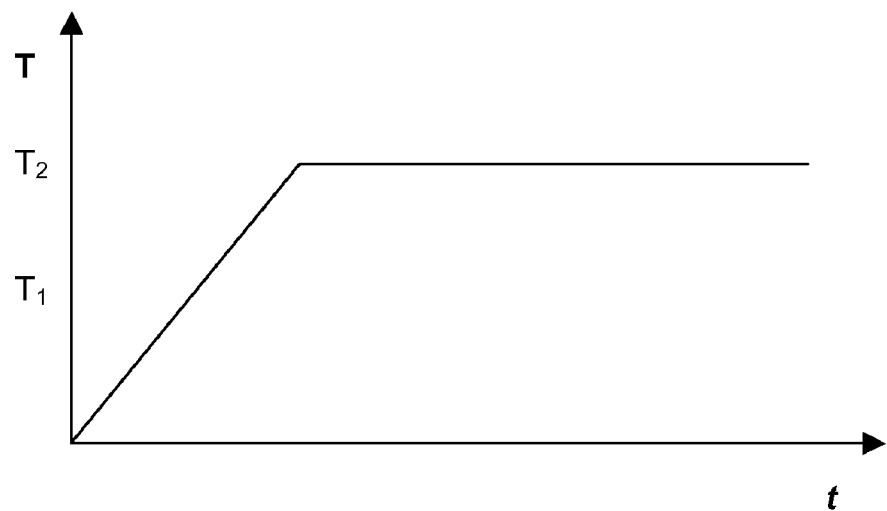
FIG. 3 is a temperature vs. time graph that illustrates a curing process in accordance with the present method.

After the prepreg sheets 1, 2, 5 have been joint together and the radius filler material 6 has been applied in order to fill up the gap 4, the structure 1, 2, 5, 6 is cured. An example of a curing process is illustrated in FIG. 3 (temperature vs. time). The curing can take place in an autoclave. In FIG. 3, starting at room temperature, the temperature is increased by 0.5-5.0° C./min, preferably 1.0-3.0° C./min, until the temperature reaches a second temperature $T_2$. Said second temperature $T_2$ corresponds to the temperature at which the prepreg material of the sheets 1, 2, 5 cures. The radius filler material 6 cures at a first temperature, $T_1$, which is lower than the second temperature $T_2$. Thus, the curing of the radius filler material 6 takes place before the curing of the prepreg sheets 1, 2, 5. In this way, benefit is drawn from the gradual heating for successive curing of the radius filler 6 and the sheets 1, 2, 5.

Figure 4:
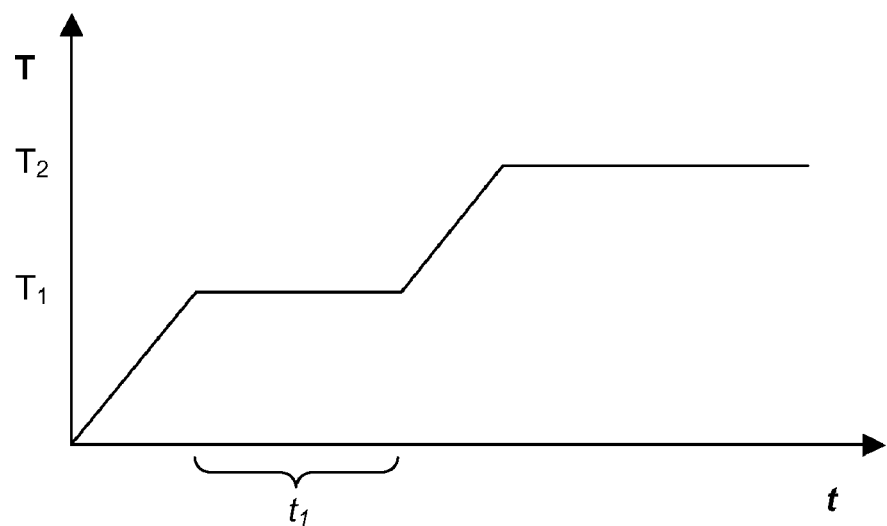
FIG. 4 shows an alternative temperature vs. time graph.

In order to ensure that the filler material 6 cures before the prepreg sheets 1, 2, 5, a curing process in accordance with FIG. 4 can be employed. Here, the heating is carried out at a rate of 0.5-5.0° C./min, preferably 1.0-3.0° C./min, until the first temperature $T_1$ is reached. Then, the first temperature $T_1$ is maintained for a time period $t_1$, during which the filler material 6 cures. The time period $t_1$ is in the range of 10-120 minutes, preferably 15-60 minutes. In the next step, the temperature is increased at a rate of 0.5-5.0° C./min, preferably 1.0-3.0° C./min, until the second temperature $T_2$ is reached and the curing of the prepreg sheets 1, 2, 5 commences.

In both curing processes above, the first temperature $T_1$ is in the range of 100-150° C., preferably 110-140° C. The second temperature $T_2$ is 170-190° C., preferably 175-185° C. The first and second temperatures $T_1$ and $T_2$ are to be adjusted in correspondence with choice of material. Here prepreg with epoxy is used for the sheets 1, 2, 5 and epoxy is used as filler material 6. The required curing time for the prepreg sheets is approximately 120 minutes.

According to the present invention, plastic materials with different curing temperatures are used for the sheets 1, 2, 5 and the radius filler 6 of the composite structure. Thus, both components, i.e. the sheets 1, 2, 5 and the radius filler 6, can be cured in a single heating process. Further, initially, the uncured radius filler material 6 can be shaped by the sheets 1, 2, 5, whereupon, after the radius filler 6 has been cured, the radius filler 6 can function as an inner tool when the sheets 1, 2, 5 are shaped.

The invention claimed is:

1. A method of manufacturing a composite structure comprising a plurality of sheets and a radius filler comprising a thermosetting material, wherein the radius filler is adapted to fill a gap at least partially formed by the sheets of the composite structure, and wherein the radius filler comprises a plastic material with a first curing temperature and the sheets comprise a plastic material with a second curing temperature, the method comprising:
   arranging the sheets in a desired shape,
   applying the radius filler material into the gap,
   exposing the sheets and the radius filler material to the first curing temperature, whereby the material of the radius filler cures, and
   exposing the sheets and the radius filler to the second curing temperature, which exceeds the first curing temperature, whereby the material of the sheets cures.

2. The method according to claim 1, wherein the radius filler material prior to curing at least partially is formed to the form of the radius filler by the sheets, and subsequently, after exposing the sheets and the radius filler to the first temperature, the sheets are at least partially formed by the radius filler.

3. The method according to claim 1, wherein the sheets comprise a second thermosetting material.

4. The method according to claim 1, wherein the first temperature is in a range of 100-150° C.

5. The method according to claim 1, wherein the second temperature is in a range of 170-190° C.

6. The method according to claim 1, wherein the temperature of the sheets and the radius filler material is kept constant at the first temperature for a time period of 10-120 minutes before the temperature is increased to the second temperature.

7. The method according to claim 1, wherein the radius filler material is preformed before it is applied into the gap.

8. The method according to claim 1, wherein the radius filler material is injected into the gap.

9. The method according to claim 1, wherein the first temperature is in a range of 110-140° C.

10. The method according to claim 1, wherein the second temperature is in a range of 175-185° C.

11. The method according to claim 1, wherein the temperature of the sheets and the radius filler material is kept constant at the first temperature for a time period of 15-60 minutes before the temperature is increased to the second temperature.

12. A method of manufacturing a composite structure comprising a plurality of sheets and a radius filler, wherein the radius filler is adapted to fill a gap at least partially formed by the sheets of the composite structure, and wherein the radius filler comprises a plastic material with a first curing temperature and the sheets comprise a plastic material with a second curing temperature, the method comprising:
   arranging the sheets in a desired shape,
   applying the radius filler material into the gap,
   exposing the sheets and the radius filler material to the first curing temperature in a range of 100-150° C., whereby the material of the radius filler cures, and exposing the sheets and the radius filler to the second curing temperature, which exceeds the first curing temperature, whereby the material of the sheets cures.

13. The method according to claim 12, wherein the first temperature is in a range of 110-140° C.

14. A method of manufacturing a composite structure comprising a plurality of sheets and a radius filler, wherein the radius filler is adapted to fill a gap at least partially formed by the sheets of the composite structure, and wherein the radius filler comprises a plastic material with a first curing temperature and the sheets comprise a plastic material with a second curing temperature, the method comprising:

arranging the sheets in a desired shape, applying the radius filler material into the gap, exposing the sheets and the radius filler material to the first curing temperature, whereby the material of the radius filler cures, and exposing the sheets and the radius filler to the second curing temperature in a range of 170-190° C., which exceeds the first curing temperature, whereby the material of the sheets cures.

15. The method according to claim 14, wherein the second temperature is in a range of 175-185° C.

* * * * *